United States Patent [19]
Redl et al.

[11] Patent Number: 5,422,005
[45] Date of Patent: Jun. 6, 1995

[54] ROTATING DISK FILTER WITH FLOW DISTRIBUTION MEANS

[75] Inventors: Simon Redl, Reichertshausen; Adolf Schneider, Schwäbisch Hall, both of Germany

[73] Assignee: Anton Steinecker Entwicklungs GmbH & Co., Freising/Attaching, Germany

[21] Appl. No.: 74,867

[22] Filed: Jan. 10, 1994

[30] Foreign Application Priority Data

Dec. 13, 1990 [DE] Germany .................. 40 39 890.0

[51] Int. Cl.[6] .................................. B01D 29/74
[52] U.S. Cl. .................... 210/330; 210/345; 210/344
[58] Field of Search .......... 210/231, 297, 329, 330, 210/343, 344, 345, 417, 405, 456

[56] References Cited

U.S. PATENT DOCUMENTS

| | | | |
|---|---|---|---|
| 1,958,394 | 5/1934 | Renfrew et al. | 210/344 |
| 3,240,344 | 3/1966 | Hoelscher | 210/340 |
| 3,251,468 | 5/1966 | Muller | 210/344 |
| 3,931,017 | 1/1976 | Schulte et al. | 210/345 |
| 4,276,166 | 6/1981 | Müller et al. | 210/345 |
| 4,708,797 | 11/1987 | Baur et al. | 210/344 |

FOREIGN PATENT DOCUMENTS 632206 9/1963 Belgium .

Primary Examiner—Robert A. Dawson
Assistant Examiner—Robert James Popovics
Attorney, Agent, or Firm—Seed and Berry

[57] ABSTRACT

The invention relates to a horizontal filter with a filter housing, in which an arrangement of superimposed, spaced filter elements is contained, and with distributor means supplying liquid to be filtered to the filter arrangement in a main direction of flow from below to the top, from which supply lines for the supply of liquid to be filtered branch off to the individual filter elements. A horizontal filter with a higher throughput is provided by the invention, since it is provided that the distributor means comprises distributor lines guided between the wall of the filter housing and the filter arrangement and supply lines in each case distributed across the circumference of the individual filter elements and branching off from the distributor lines, and that the supply lines are in each case provided with a flow reduction chamber, which has at least one communication opening to a distributor line and at least one outlet opening for the discharge of liquid to be filtered above the allocated filter element.

21 Claims, 3 Drawing Sheets

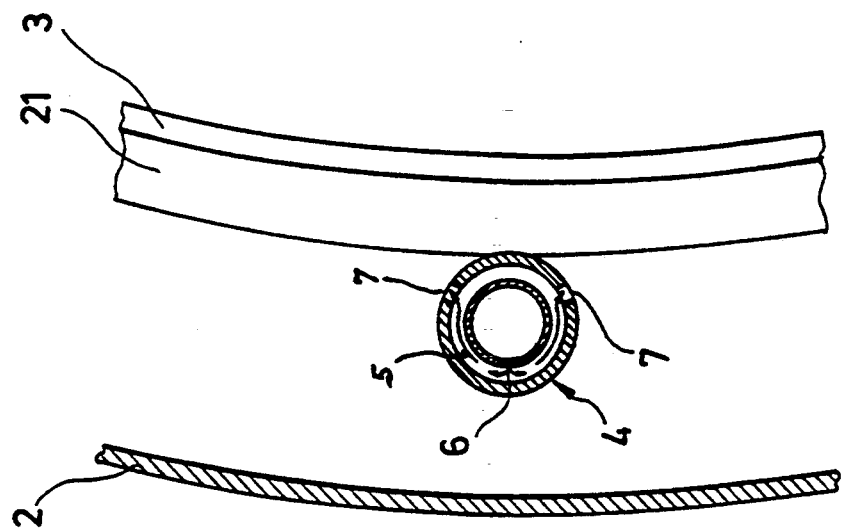
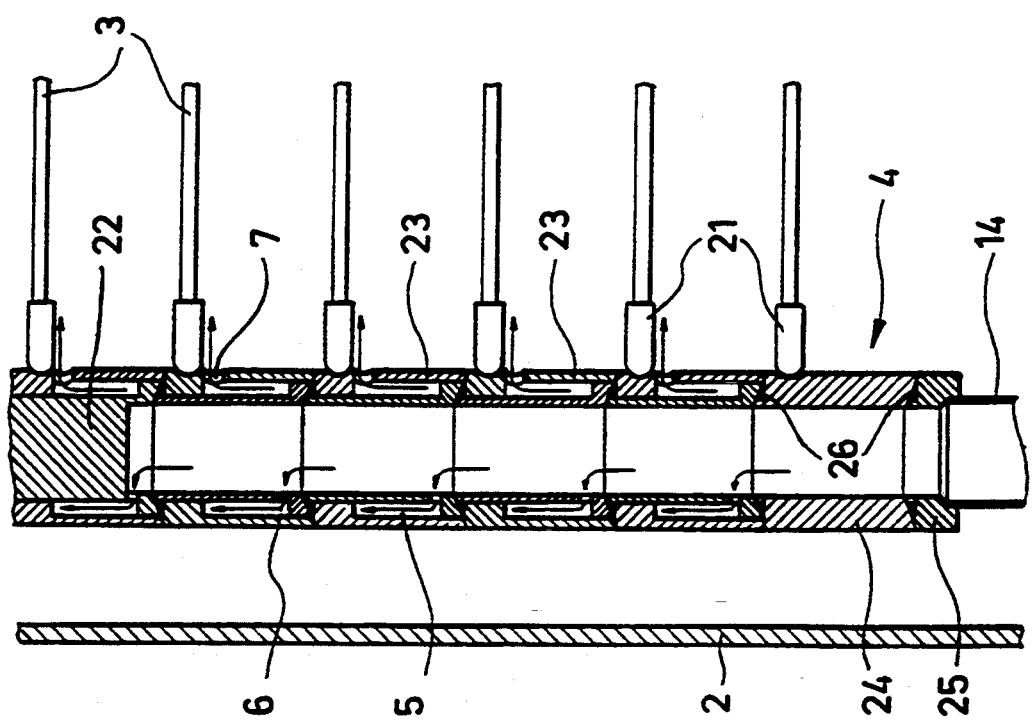

ROTATING DISK FILTER WITH FLOW DISTRIBUTION MEANS

The invention relates to a centrifugal cleaning filter comprising filter plates spaced vertically above each other on an axis of rotation and disposed in a filter housing and distributor lines supplying liquid to be filtered in a main direction of flow from the bottom to the top, comprising at least one outlet opening above a respectively associated filter plate and disposed peripherally to the filter plates.

TECHNICAL FIELD

A centrifugal cleaning filter of the type mentioned at the beginning is known from DE-OS 18 12 495. This filter comprises a housing with circular horizontal cross-sections, in whose perpendicular central axis a hollow shaft is provided. Circular-disk-shaped filter plates are disposed on the hollow shaft one above the other at uniform distances in horizontal planes. The hollow shaft is rotatably mounted in a bearing in the cover of the housing. The lower end of the hollow shaft is guided out of the housing through the housing bottom and connected with a driving means. An outlet opening is provided in the bottom of the housing on one side of the hollow shaft. Ducts extending substantially vertically are provided distributed uniformly across the circumference at the casing of the housing as distributor lines for the supply of liquid to be filtered, which are formed by semi-pipes, which are fastened to the outer side of the housing with their marginal zones. Nozzle-like openings are provided in the walls of the housing in the area of each of the perpendicular ducts, at least one nozzle opening being located in each case above the filter plates for the outlet and supply of liquid to be filtered to the filter plates. The nozzle openings are in each case provided approximately in the upper third between two adjacent filter plates.

BACKGROUND OF THE INVENTION

A filter is known from DE 35 29 706 C2, which has disk-shaped filter elements which are traversed by an axis of rotation in their centre about which the entire filter arrangement is rotatable. Vertical distributor lines connected with the rotatable filter arrangement for the supply of liquid to be filtered are provided distributed across the circumference near the axis of rotation. Supply lines for the supply of the liquid to be filtered to the individual filter element branch off from the distributor lines. The supply lines for a specific filter element open in each case to an annular chamber which is formed between a distributor plate which is in parallel to the filter plate and the lower side of the filter element located in each case above the supply line. The upper side of the filter element comprises a filter cloth layer made of special steel, which rests on a plate impervious to liquid forming the lower side of the filter element. The liquid filtered through the filter cloth (filtrate) runs off on the plate towards the centre, where corresponding discharge ducts are provided. The liquid to be filtered supplied under pressure through the vertical distributor lines enters the annular chambers through the supply lines during the filtering operation and is distributed across the upper side of the filter element located below the same by means of the distributor plates. Filtering expedients such as diatomaceous earth are deposited on the filter cloth of the filter element forming a filtering deposit. The deposit clogged by filtering residues after a specific service life is thrown off from the filter elements by rotating the filter arrangement about the axis of rotation.

It is the object of the present invention to provide a centrifugal cleaning filter of the type mentioned at the beginning, which is improved as compared with the described filter of this type known from the prior art in its efficiency.

SUMMARY OF THE INVENTION

The filter according to the invention solving this object is characterized in that the distributor lines are in each case provided with at least one communication opening to the flow reduction chamber.

It is ensured by this solution according to the invention that the liquid to be filtered and in particular entrained filtering expedients are distributed highly uniformly on the filter plates. This uniform distribution is achieved since reduced flows of liquid to be filtered are supplied peripherally to the chambers, distributed by the circumferential edge of the filter plates, an increase in the available occupation volume of liquid to be filtered or filtering expedients, which occurs i.a. due to preceding deposits of the material in the outer areas of the filter plate, is compensated for by the fact that the surfaces to be occupied get smaller towards the interior. Due to the more uniform distribution of the liquid to be filtered, high throughput quantities are achieved, since in particular the throwing off of the added filtering expedient coatings can be carried out at longer intervals.

In an advantageous development of the invention it is provided that the communication opening in the flow reduction chamber is provided at a greatest possible distance from the outlet opening. Due to this measure an especially high degree of flow reduction of the liquid to be filtered and being under pressure is achieved. The formation of eddies which could wash the filtering deposits away in places is prevented.

In a further advantageous development of the invention it can be provided that at least one outlet opening is disposed barely below the next higher filter plate. An especially uniform distribution of the liquid to be filtered is achieved on the filter plate by means of this measure.

A further advantageous development possibility of the invention consists in providing at least one outlet opening for the discharge of the liquid to be filtered at an angle obliquely to the tangent of the circumferential edge of the filter plate. This measure serves for further increasing the uniformity of the distribution of the liquid to be filtered on the filter plate.

In a preferred embodiment for the invention it is provided that the distributor lines comprise a profile provided with a line duct. The profile has in particular one longitudinal recess adjoining the line duct, in which a profile strip which is adapted thereto in its cross-section and has recesses forming the flow reduction chambers, is disposed.

In a further preferred embodiment of the invention it is provided that the distributor lines have segments which are preferably connected with the filter plates. The distributor lines can advantageously be joined by putting together the filter elements to a filter arrangement from the segments connected with the filter elements.

Further advantageous development possibilities of the invention and preferred examples of embodiment of the invention are revealed by the sub-claims.

The invention will now be explained in greater detail and described by means of examples of embodiment and the drawings relating to these examples of embodiment.

BRIEF DESCRIPTION OF THE DRAWINGS

FIG. 2 shows a lateral view of a distributor line used in the example of embodiment according to FIG. 1, FIG. 3 shows a top view of the distributor line according to FIG. 2.

Figure 1:
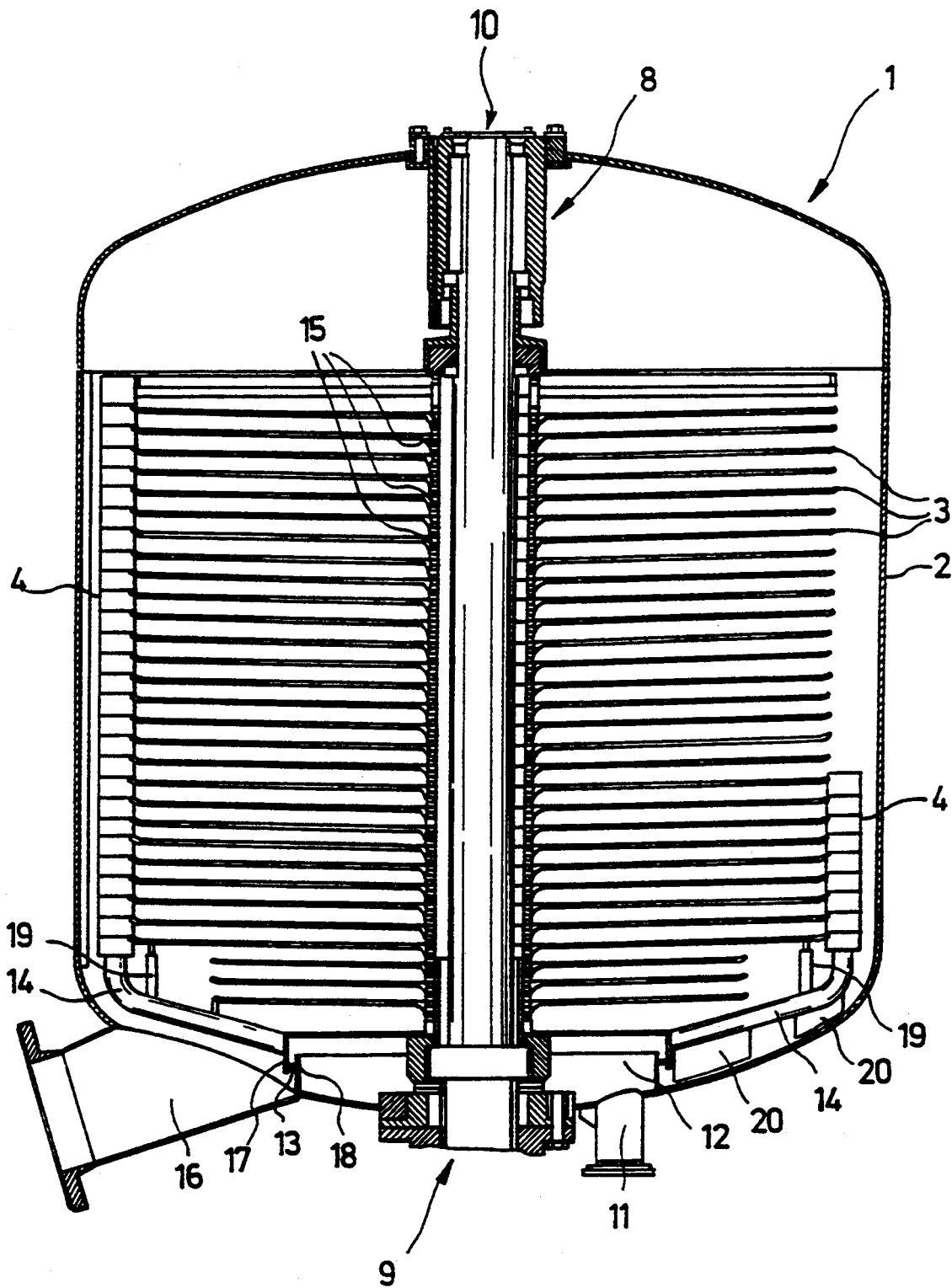
FIG. 1 shows an example of embodiment of an centrifugal cleaning filter according to the invention.

A filter housing with a housing wall 2 is designated with the reference numeral 1 in FIG. 1. An arrangement of disk-shaped filter elements 3 is located within the housing 1, which are provided in superimposed relationship and spaced at an equal vertical distance. The filter elements which can be put together to the shown filter arrangement and have an opening in their centre, are provided with segments distributed across their circumferential edge, by means of which distributor lines 4 are formed upon the putting together of the filter elements to the filter arrangement. These distributor lines, at least two of which being provided in symmetrical arrangement, will be explained later in greater detail by means of FIGS. 2 and 3. The arrangement of the filter elements 3 is connected with an axis of rotation 10 mounted in bearings 8 and 9 and guided through the centre openings of the filter elements so that the entire arrangement together with the axis of rotation, which is drivable by a motor not shown in FIG. 1, can be rotated. The filter elements 3 consist in each case of an upper layer of a filter cloth, e.g. made of special steel, and a lower impervious layer on which the filtrate can run off towards the centre of the plate and can flow off through the ducts 15 near the axis of rotation into the lower part of the interior of the filter housing and can finally be discharged from the filter housing through the outlet 16 of the filter housing.

An inlet for the liquid to be filtered is designated with the reference numeral 11 in FIG. 1, which opens into a distribution chamber. The distribution chamber has a housing wall portion 17 which is rotatable together with the axis of rotation and the filter arrangement, which is adjoined by supply lines 14 distributed across its circumference for the distributor lines 4 formed by the segments. The rotatable housing wall portion 17 is sealed against a stationary lower portion 18 of the housing forming the distribution chamber 12 by an annular seal 13. The lower housing portion 18 is connected with the wall of the filter housing, the wall of the filter housing closing the distribution chamber 12 towards below. Support elements for stabilizing the supply lines 14 are designated with 19, which are connected at one end with the supply lines and at their other end with a filter element. Discharge elements 20 for discharging filtering expedients from the filter housing are provided on the supply lines 14.

FIGS. 2 and 3, in which the same parts are designated with the same reference numerals as in FIG. 1, reveal that the distributor segments 23 forming the line 4 have in each case a wall consisting of two layers, the layers being provided with recesses for forming an annular chamber 5. The respective annular chamber 5 of the segments is in each case connected with the interior of the distributor line 4 formed by the segments. The annular chambers 5 have in each case outlet openings 7 in the half facing the filter elements 3, which directly disposed below the filter element 3 in the present embodiment, with which the respective segment is connected. The passage cross sections of the outlet openings are both greater in the represented example of embodiment than the passage cross-section of the communication opening.

In the present example of embodiment, the segments are connected with the filter elements 3 via clamping rings 21 provided on the circumferential edge of the filter elements for stabilizing the filter elements, e.g. by weldings.

A segment 24 is fastened to the lowermost filter element, to which no filter element to be charged with liquid to be filtered is allocated and in which consequently no annular chamber is provided. The segment 24 rests on an adapter element 25 connected with the distributor pipe 14. A sealing element 22 for sealing the distributor line 4 towards above is inserted into the segment connected with the uppermost filter element.

Sealing rings disposed between the individual segments are designated with 26.

The distributor lines are formed upon the putting together of the filter arrangement from the filter elements 3, since segments 23 are fastened to each filter element, distributed across its circumference in the same arrangement. In the present example of embodiment the annular abutting surfaces between the individual segments are inclined towards the longitudinal axis of the distributor lines 4, whereby a centering effect is achieved upon the putting together of the filter elements with the segments fastened thereto. An effective sealing of the distributor lines is attained by means of the sealing rings 26 provided in the abutting areas. A suitably selected tension force acting on the upper and lower sides of the filter arrangement and keeping the filter arrangement together may also serve as an effective sealing of the distributor lines provided around the filter arrangement. In addition, the segments have advantageously the function of spacers within the filter arrangement.

During the filtering operation, the liquid to be filtered (or in the preparation of the operation, water with filtering expedients) enters the distribution chamber 12 through the inlet 11 and is supplied to the distributor lines 4 via the supply lines 14 opening into the distribution chamber 12. The flow rate may be between 0.8 and 3.5 m/s depending upon the filter sizes of 20 to 60 $m^2$. The liquid to be filtered, which is under pressure, enters the annular chambers 5 through the communication opening 6, where a reduction of the flow of the liquid to be filtered occurs with a reduction of the flow rate to values between 0.05 and 0.075 m/s, and the liquid to be filtered is discharged from the annular chambers 6 through the outlet openings 7 which have a larger cross-section in each case below the filter element connected with the respective segment, a uniform distribution of the liquid to be filtered or of a filtering expedient entrained with the liquid to be filtered on the filter element located below the outlet opening taking place. The filtrate having passed through the filter cloth of the filter plates and the deposited filtering expedient, e.g. diatomaceous earth, runs off towards the centre of the filter element on the impervious plate forming the lower side of the filter elements and enters the free interior of the filter housing through the openings 15, from which it can be discharged through the outlet 16. After a specific service life, the filter arrangement can be cleaned by rotating it about the axis of rotation, filtering expedients and filtering residues being thrown off and being capable of being discharged from the filter housing through the outlet 16 by means of the discharging means 20.

A uniform distribution of the liquid to be filtered or of entrained filtering expedients on the filter plates is achieved by the shown arrangement of the distributor lines with the annular chamber, via which the liquid to be filtered is supplied to the filter elements in peripheral fashion and distributed relatively uniformly across their circumference, a flow reduction place in the annular chambers, by compensating for the supply of material decreasing due to the depositing of material in the outer areas of the filter plate towards the centre by the fact that the filter surface to be occupied becomes smaller towards the interior. An especially uniform distribution is achieved if, as in the present example of embodiment, the outlet opening is disposed as far as possible above the allocated filter plate, i.e. barely below the filter plate, being located thereabove. It has an especially advantageous effect with respect to the uniformity of the distribution of material if, as in the present example of embodiment, outlet openings are provided in such fashion that the liquid to be filtered is discharged from the outlet openings at an angle obliquely to the tangent on the filter disk, and e.g. two outlet openings disposed symmetrically to a vertical on the tangent are provided. An especially effective flow reduction effect of the liquid to be filtered is achieved by providing, as in the present example of embodiment, the communication opening 6 of the flow reduction chambers designated as an annular chamber in the present example of embodiment at a distance from the outlet openings being as great as possible, the chamber extending advantageously across the entire length utilizable between two filter plates.

In the example of embodiment according to FIGS. 1 to 3, no segments with outlet openings are provided for the three lowermost filter plates.

Figure 6:
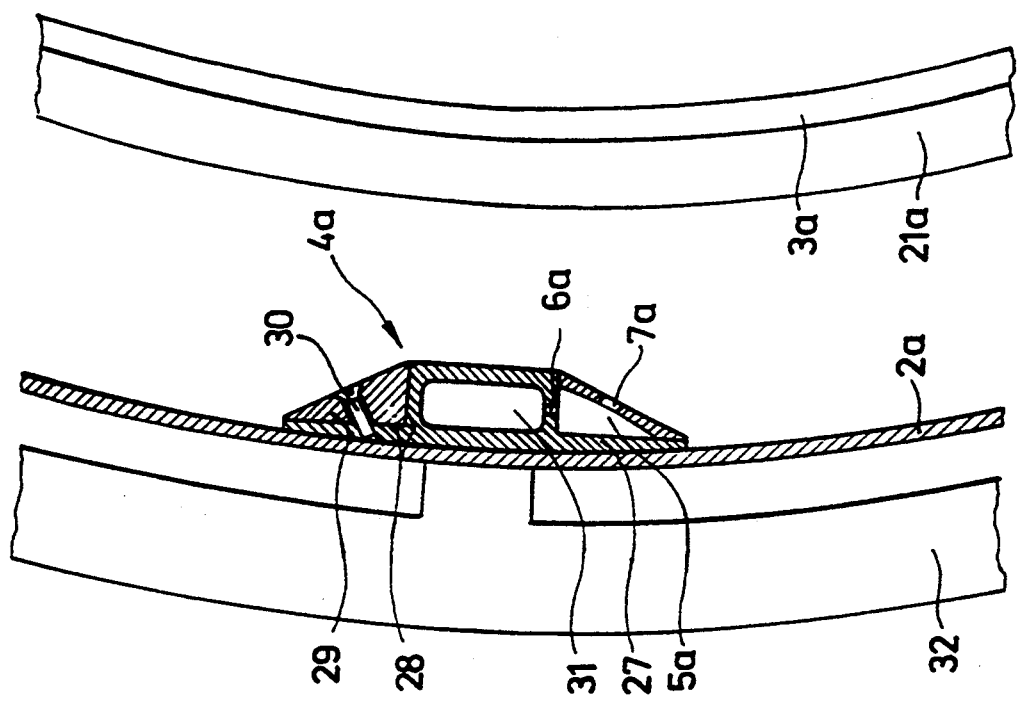
FIG. 6 shows a top view the example of embodiment according to FIG. 4 (in details).
Figure 5:
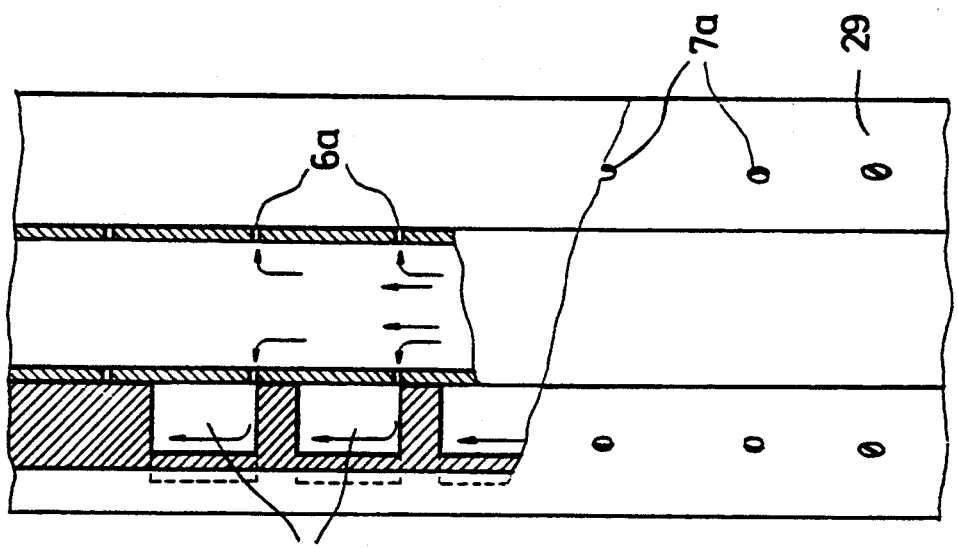
FIG. 5 shows the distributor line 4 in a lateral view vertical to the view according to FIG. 4 (in details)
Figure 4:
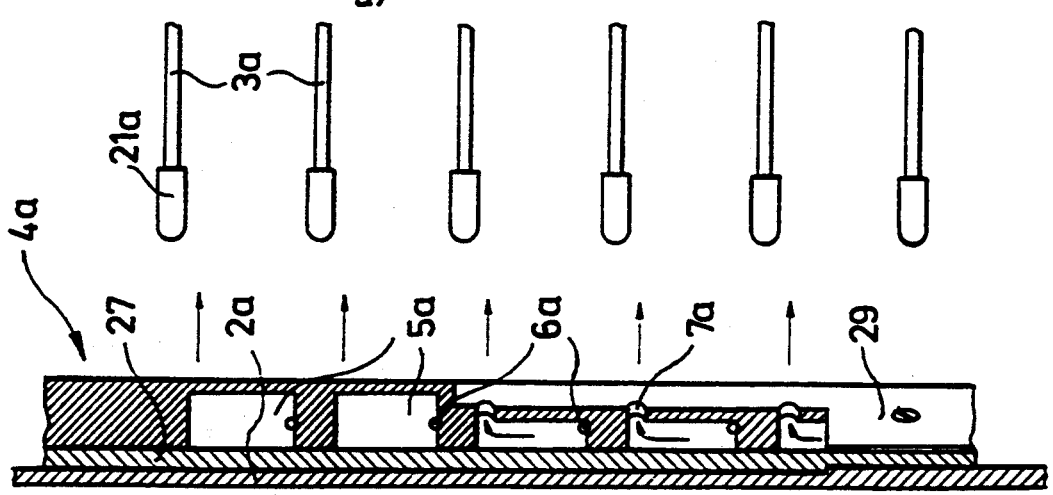
FIG. 4 shows a further example of embodiment of a centrifugal cleaning filter according to the invention (in details) with a distributor line fastened to the wall of the filter housing.

The same elements or elements having the same effect are designated with the same reference numerals as in the preceding Figs, but provided with the supplement a in FIGS. 4 to 6.

The example of embodiment represented FIGS. 4 to 9 differs from the example of embodiment according to FIGS. 1 to 3 above all in that the distributor lines 4a are firmly connected with the housing wall, e.g. by means of welding, and are disposed detached from the rotatable filter arrangement.

A profile for forming distributor lines 4a with a line duct 31 is designated with 27 in FIGS. 4 to 6, such profiles being disposed in distributed fashion across the circumference of a filter arrangement formed of filter elements 3a. The profile rail 27 has longitudinal recesses in the form of rectangular niches on both sides of the side walls forming the duct 31, in which longitudinal rails 29 with a triangular cross-section are disposed and fastened with screws 30. Recesses are provided in the longitudinal rails 29, by means of which the flow reduction chambers 5a are formed, a sealing of these chambers being effected via the abutting sealing surfaces 28 of the longitudinal rail 29 and the profile 27. Instead of continuous rails, rail segments can also be used in each case only for the formation of one or of a specific number of chambers. An annular, horizontal distributor line for the liquid to be filtered, which is provided outside of the filter housing and which is in communication with the line duct 31 of the individual distributor lines 4a, distributed across the circumference of the filter arrangement, is designated with 32 in FIG. 4.

During the filtering operation, the liquid to be filtered is supplied via this line 32, gets into the ducts 31 and, for flow reduction, is guided at first via the communication openings 6a in the chambers 5a and then through the outlet openings 7a out of the chambers 5a in each case barely below the next higher filter element. In the example of embodiment according to FIGS. 4 to 6, two flow reduction chambers with one outlet opening 7a each are provided for each filter element and distributor line, the liquid to be filtered being discharged through this outlet opening in similarly oriented fashion with respect to the tangent of the filter element as in the example of embodiment according to FIGS. 1 to 3. It is likewise ensured that the distance between the communication openings 6a and the outlet openings 7a is as great as possible.

We claim:

1. A rotating disk filter with flow distribution means, comprising: a filter housing provided with an inlet and an outlet; filter plates vertically spaced one above the other on an axis of rotation and disposed horizontally in the filter housing, the filter plates having a pervious upper layer utilized as a filter area and a lower impervious layer utilized for receiving and discharging filtrate;
   a means for rotating the filter plates; and
   distributor lines for supplying liquid to be filtered in a main, upwardly direction of flow, the distribution lines being disposed in such a manner that they are distributed about the filter plates, each of the distributor lines comprising at least one outlet opening above at least one respectively located filter plate, whereby several outlet openings are distributed over the circumference of each filter plate and the several outlet openings lead onto each filter plate, and each of the distributor lines is provided with at least one flow calming chamber extending along at least a part of a circumference of the distributor line, the distributor line having at least one communication opening leading to the flow calming chamber and the at least one outlet opening connected to the flow calming chamber by which the liquid to be filtered can flow onto the filter plate only through the flow calming chamber of the distributor line.

2. The rotating disk filter according to claim 1 wherein the distributor lines extend vertically.

3. The rotating disk filter according to claim 1 or 2 wherein the distributor lines are connected to the housing wall.

4. The rotating disk filter according to claims 1 or 2 wherein the distributor lines are connected to the filter plates.

5. The rotating disk filter according to claim 1 wherein the distributor lines comprise segments connected to the filter plates.

6. The rotating disk filter according to claim 5 wherein the distributor lines are formed by the segments connected to each filter plate with the filter plates being arranged one above the other and the segments being aligned.

7. The rotating disk filter according to claim 5 wherein sealing rings are provided at abutting points between the segments.

8. The rotating disk filter according to claim 1 wherein the flow calming chamber is disposed as an annular chamber around the distributor line.

9. The rotating disk filter according to claim 1, wherein the distributor lines have a circular cross-section.

10. The rotating disk filter according to claim 1 wherein the distributor lines are formed from a profile body which comprises a line duct for the liquid to be filtered.

11. The rotating disk filter according to claim 10 wherein the profile body comprises at least one longitudinal recess adjoining the line duct, and a profile strip is disposed in the longitudinal recess, the profile strip having recesses in its cross-section that form the flow calming chambers.

12. The rotating disk filter according to claim 1 wherein the longitudinal recess of the profile strip has a triangular cross-section.

13. The rotating disk filter according to claim 1 wherein at least one outlet opening is disposed in the flow calming chamber of the distributor line above the communication opening.

14. The rotating disk filter according to claim 1 wherein at least one outlet opening is provided for a discharge of the liquid to be filtered at an angle obliquely to the tangent of a circumferential edge of the filter plate.

15. The rotating disk filter according to claim 1 wherein two outlet openings are provided per flow calming chamber.

16. The rotating disk filter according to claim 15 wherein the two outlet openings are disposed symmetrically with respect to a radius line of the filter plate.

17. The rotating disk filter according to claim 16 wherein the communication opening in the flow calming chamber is provided at a greatest possible distance to the outlet opening.

18. The rotating disk filter according to claim 17 wherein the liquid to be filtered is discharged from two outlet openings at angles being opposed with respect to the radius line of the filter plates.

19. The rotating disk filter according to claim 1 wherein a passage cross-section formed by at least one outlet opening is greater than a passage opening formed by the at least one communication opening.

20. The rotating disk filter according to claim 1 wherein at least one outlet opening is disposed immediately below the next higher filter plate.

21. The rotating disk filter according to claim 1 wherein at least two oppositely disposed outlet openings for the liquid to be filtered are provided per filter plate.

* * * * *

UNITED STATES PATENT AND TRADEMARK OFFICE
CERTIFICATE OF CORRECTION

PATENT NO.    : 5,422,005
DATED         : June 6, 1995
INVENTOR(S)   : Simon Redl and Adolf Schneider It is certified that error appears in the above identified patent and that said Letters Patent is hereby corrected as shown below:

In column 7, claim 12, line 25, please delete "1" and substitute therefor --11--.

Signed and Sealed this

Fourteenth Day of November, 1995

Attest:

BRUCE LEHMAN

*Attesting Officer*    *Commissioner of Patents and Trademarks*

UNITED STATES PATENT AND TRADEMARK OFFICE
CERTIFICATE OF CORRECTION

PATENT NO. : 5,422,005
DATED : June 6, 1995
INVENTOR(S) : Simon Redl, et al

It is certified that error appears in the above-indentified patent and that said Letters Patent is hereby corrected as shown below:

On the title page,
    item [22] should be corrected to read:
        "PCT Filed: December 9, 1991"

insert items [86] and [87] as follows:
    [86]  PCT No.:   PCT/EP91/02355
         § 371 Date:   January 10, 1994
         § 102(e) Date: January 10, 1994

[87]  PCT Pub. No.:   WO92/10267
         PCT Pub. Date:   June 25, 1992

Signed and Sealed this

Fifth Day of March, 1996

Attest:

BRUCE LEHMAN

*Attesting Officer*      *Commissioner of Patents and Trademarks*